(12) United States Patent
Hutchinson

(10) Patent No.: US 9,381,834 B2
(45) Date of Patent: Jul. 5, 2016

(54) CHILD SAFETY SEAT

(71) Applicant: James M.F. Hutchinson, Mohnton, PA (US)

(72) Inventor: James M.F. Hutchinson, Mohnton, PA (US)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 0 days.

(21) Appl. No.: 14/218,937

(22) Filed: Mar. 18, 2014

(65) Prior Publication Data
US 2014/0284978 A1    Sep. 25, 2014

Related U.S. Application Data

(60) Provisional application No. 61/852,790, filed on Mar. 21, 2013.

(51) Int. Cl.
*A47C 1/08* (2006.01)
*B60N 2/26* (2006.01)
*B60N 2/28* (2006.01)

(52) U.S. Cl.
CPC .............. *B60N 2/265* (2013.01); *B60N 2/2812* (2013.01); *B60N 2/2827* (2013.01); *B60N 2/2851* (2013.01)

(58) Field of Classification Search
CPC ......... B60R 22/00; B60R 22/02; B60N 2/265
USPC ............ 297/250.1, 256.15, 216.11, 467, 484, 297/410
See application file for complete search history.

(56) References Cited

U.S. PATENT DOCUMENTS

| | | | | |
|---|---|---|---|---|
| 6,491,348 B1* | 12/2002 | Kain | ............................. | 297/484 |
| 6,623,074 B2* | 9/2003 | Asbach et al. | ............. | 297/250.1 |
| 6,688,685 B2* | 2/2004 | Kain | ........................... | 297/250.1 |
| 6,779,843 B2* | 8/2004 | Kain | ........................... | 297/250.1 |
| 7,232,185 B2* | 6/2007 | Hartenstine et al. | ........ | 297/250.1 |
| 8,226,162 B2* | 7/2012 | Campbell et al. | ........ | 297/216.11 |
| 8,613,480 B1* | 12/2013 | Campbell et al. | ............. | 297/253 |
| 8,944,503 B2* | 2/2015 | Gates et al. | .............. | 297/256.15 |
| 2003/0193225 A1 | 10/2003 | Kain | | |
| 2004/0189068 A1* | 9/2004 | Meeker et al. | ............. | 297/250.1 |
| 2005/0012372 A1* | 1/2005 | Baloga et al. | ............ | 297/256.15 |
| 2005/0225136 A1* | 10/2005 | Horton | ................. | B60N 2/2812 297/250.1 |
| 2007/0236061 A1* | 10/2007 | Meeker et al. | ............. | 297/250.1 |
| 2011/0006572 A1* | 1/2011 | Zhao | ......................... | 297/256.15 |
| 2011/0062756 A1* | 3/2011 | Campbell et al. | .......... | 297/250.1 |
| 2011/0309663 A1* | 12/2011 | Brunick | ............... | B60N 2/2851 297/250.1 |
| 2012/0007397 A1* | 1/2012 | Fritz | .................... | B60N 2/2806 297/250.1 |
| 2012/0074758 A1 | 3/2012 | Gates | | |
| 2012/0242129 A1* | 9/2012 | Gaudreau, Jr. | ....... | B60N 2/2812 297/256.16 |
| 2014/0246889 A1* | 9/2014 | Strong et al. | ............. | 297/256.15 |

FOREIGN PATENT DOCUMENTS

CN    102341268 A    2/2012

* cited by examiner

*Primary Examiner* — David E Allred
*Assistant Examiner* — Alexander Harrison
(74) *Attorney, Agent, or Firm* — Winston Hsu; Scott Margo

(57) ABSTRACT

The child safety seat disclosed in the present invention includes a seatback, a headrest and a belt. The headrest is disposed on the seatback, and is adapted to move relative to the seatback up and down. The headrest includes an inclined guiding portion disposed on a bottom portion of the headrest, and an indentation of the inclined guiding portion points upward. The belt is disposed between the seatback and the headrest. The belt slidably contacts the headrest when a passenger sits the child safety seat and is constrained by the belt, and the headrest moves downwardly so that the inclined guiding portion drives the belt to be close to a center of the headrest. A height of the headrest is adjustable, a shoulder belt of the belt automatically moves when the height of the headrest is adjusted, and the neck of the passenger can be constrained by the shoulder belt.

6 Claims, 4 Drawing Sheets

US 9,381,834 B2

CHILD SAFETY SEAT

CROSS REFERENCE TO RELATED APPLICATIONS

This application claims the benefit of U.S. provisional application No. 61/852,790, filed on Mar. 21, 2013. The entire contents of these related applications are incorporated herein by reference.

BACKGROUND OF THE INVENTION

1. Field of the Invention

The present invention relates to a child safety seat, and more particularly, to a child safety seat with a belt positioning control function.

2. Description of the Prior Art

A conventional child safety seat utilizes three-point safety belt or five-point safety belt to fix the newborn baby or the child on the seat. The safety belt is movably disposed on the seat, the child can sit the seat conveniently by stretching a length of the safety belt, and the safety belt is shortened to stably fix the child on the seat. The safety seat includes the headrest and the seatback. Two shoulder belts of the safety belt pass the shoulder of the child and pierce through connection between the headrest and the seatback, and low ends of the safety belt pass the hip and the waist of the child and are connected to the bottom of the seatback. The connection of the headrest and the seatback of the conventional child safety seat is a level plane. Distance between the shoulder belts of the safety belt is constant when the safety belt slides along the level plane, the shoulder belt cannot efficiently constrain the neck of the child, and the safety belt is easily dropped from the should of the child. That is, the conventional child safety seat is unsafe.

SUMMARY OF THE INVENTION

The present invention provides a child safety seat with a belt positioning control function for solving above drawbacks.

According to the claimed invention, the child safety seat includes a seatback, a headrest and a belt. The headrest is disposed on the seatback, and is adapted to move relative to the seatback up and down. The headrest includes an inclined guiding portion disposed on a bottom portion of the headrest, and an indentation of the inclined guiding portion points upward. The belt is disposed between the seatback and the headrest. The belt slidably contacts the headrest when a passenger sits the child safety seat and is constrained by the belt, and the headrest moves downwardly so that the inclined guiding portion drives the belt to be close to a center of the headrest.

According to the claimed invention, the inclined guiding portion is disposed on a low edge of the headrest.

According to the claimed invention, the seatback includes an opening disposed adjacent to the headrest. The belt passes through the opening to stretch from one side of the seatback to the other opposite side of the seatback.

According to the claimed invention, the inclined guiding portion is an arc structure.

According to the claimed invention, the inclined guiding portion comprises a first surface and a second surface connected to each other. An angle is formed between the first surface and the second surface.

According to the claimed invention, the first surface and the second surface respectively are a planar surface and an arc surface.

The child safety seat of the present invention at least includes following advantages: the inclined guiding portion includes the indentation, the shoulder belts of the belt move close to each other via the indentation when the belt slides along the inclined guiding portion, and the distance between the shoulder belts is shortened to fit the shoulder and the neck of the passenger. In addition, the height of the headrest is adjustable. The belt can be automatically adjusted to vary the distance between the shoulder belts when the height of the headrest is changed, so as to accordingly increase the constraint and the safety of the child safety seat.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
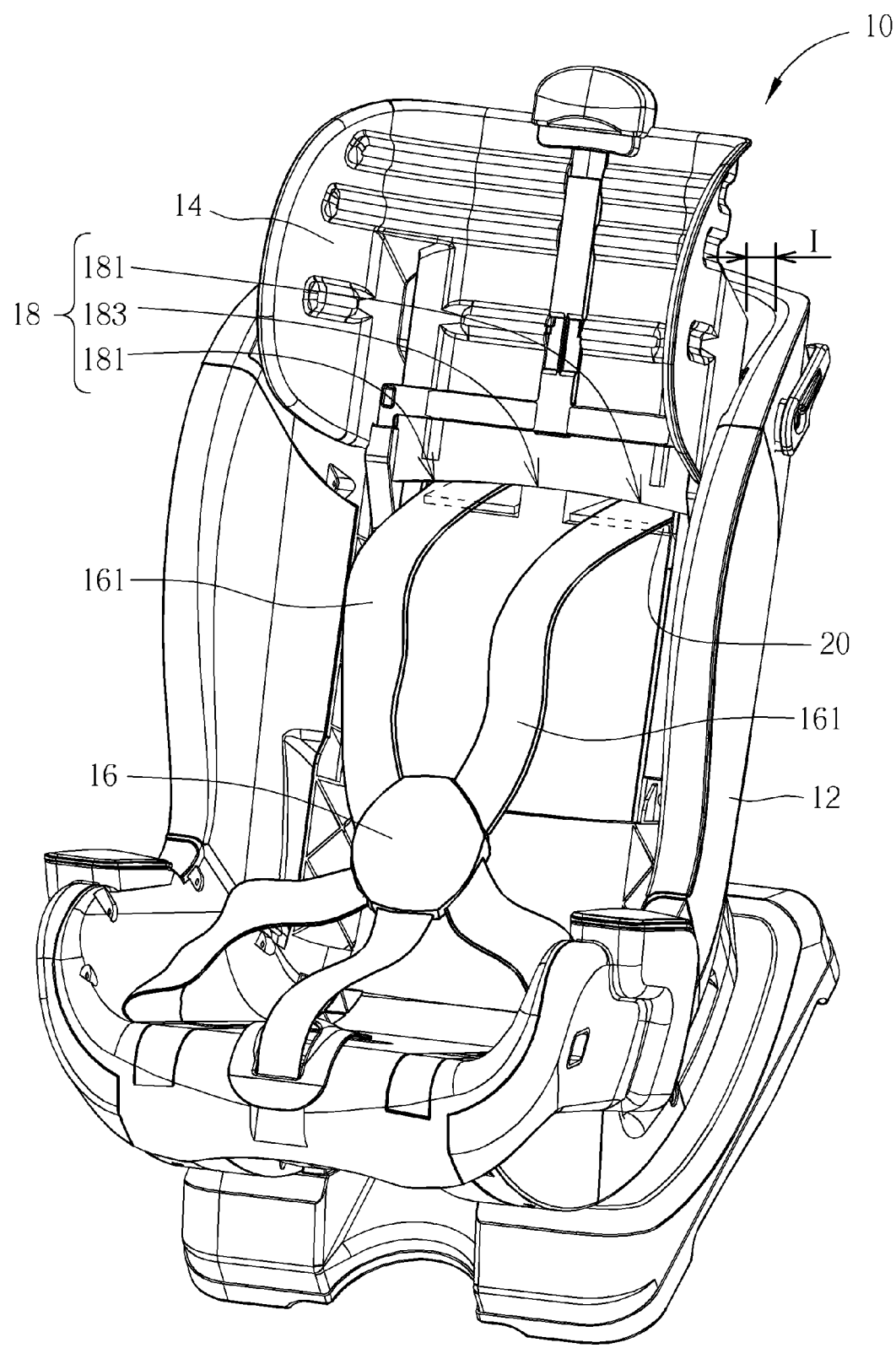
FIG. 1 is a diagram of a child safety seat according to a first embodiment of the present invention.

Please refer to FIG. 1. FIG. 1 is a diagram of a child safety seat 10 according to a first embodiment of the present invention. The child safety seat 10 includes a seatback 12, a headrest 14 and a belt 16. The headrest 14 is disposed on the seatback 12, and can move relative to the seatback 12 up and down. The belt 16 passes through an interval I which is formed between the headrest 14 and the seatback 12. The interval I is a distance between outer surfaces the headrest 14 and the seatback 12. A part (not shown in figures) of the belt 16 is located behind the seatback 12, and the other part of the belt 16 is located before of the seatback 12. It is to say, the belt 16 passes through connection between the seatback 12 and the headrest 14, and a length of the belt 16 can be increased and decreased by a rolling mechanism (which is usually disposed on the rear of the seatback 12 and not shown in figures) according to user's demand, so that the child safety seat 10 can be adjustable for a passenger (a newborn baby or a child) with different height and weight. Preferably, the headrest 14 is movably disposed on the seatback 12. The headrest 14 moves relative to the seatback 12 to adjust a height of the headrest 14, part of the belt 16, which is exposed on the front of the child safety seat 10, is covered by the headrest 14, and the length of the belt 16 is automatically varied accordingly.

As shown in FIG. 1, the headrest 14 includes an inclined guiding portion 18 disposed on a bottom portion of the headrest 14, and an indentation of the inclined guiding portion 18 points upward. For example, the inclined guiding portion 18 is formed on a low edge (the belt routing edge) of the headrest 14. The seatback 12 includes an opening 20 disposed adjacent to the headrest 14. The belt 16 passes through the opening 20, and the belt 16 can move from one side (a rear side) of the seatback 12 to the other opposite side (a front side) of the seatback 12. The belt 16 can slide relative to the inclined guiding portion 18 when the headrest 14 moves relative to the seatback 12 downwardly to decrease the height of the headrest 14, which means the belt 16 is pressed by the inclined guiding portion 18, and the belt 16 can laterally move over a structural surface of the inclined guiding portion 18.

Figure 2:
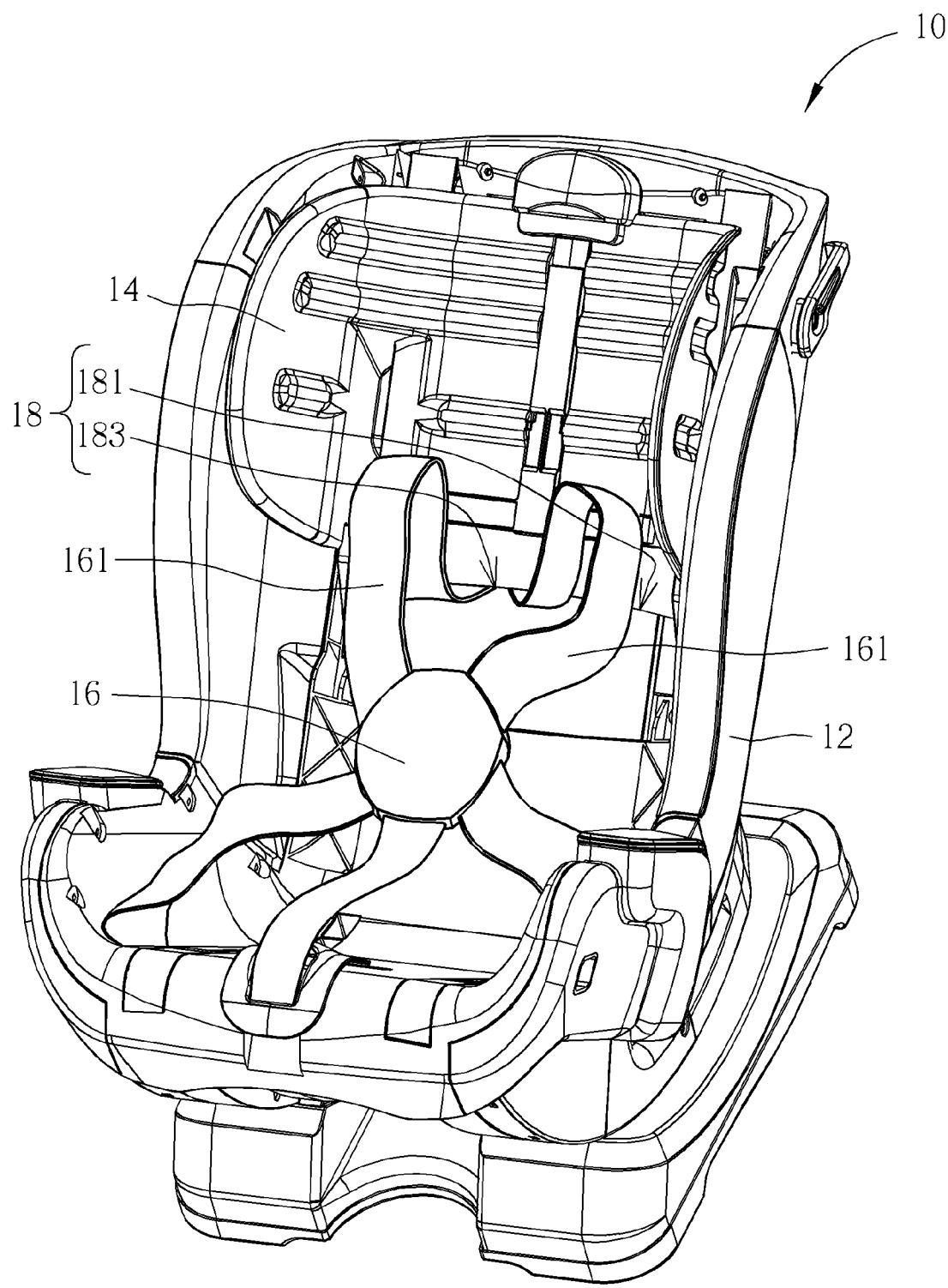
FIG. 2 is a diagram of the child safety seat in another operational mode according to the first embodiment of the present invention.

In the first embodiment, the inclined guiding portion 18 is an arc structure. Height of two lateral ends 181 of the arc structure is lower than height of a middle 183 of the arc structure, which means the inclined guiding portion 18 is an indent structure, and the indentation of the indent structure upwardly points a top of the child safety seat 10. Please refer to FIG. 2. FIG. 2 is a diagram of the child safety seat 10 in another operational mode according to the first embodiment of the present invention. When the headrest 14 slidably contacts the belt 16, the inclined guiding portion 18 drives the belt 16 to be close to the center (such as the middle 183 of the inclined guiding portion 18) of the headrest 14, as shown in FIG. 2. Two upper ends 161 of the belt 16 can move from the lateral sides 181 to the middle 183 of the inclined guiding portion 18. The upper ends 161 are getting closed, and a distance between the upper ends 161 is decreased according to a movement of the belt 16 relative to the inclined guiding portion 18. Therefore, the belt 16 of the child safety seat 10 is automatically adjusted to completely cover a shoulder (or a neck) of the small-size passenger, so as to improve constraint of the belt 16 for the passenger.

Figure 3:
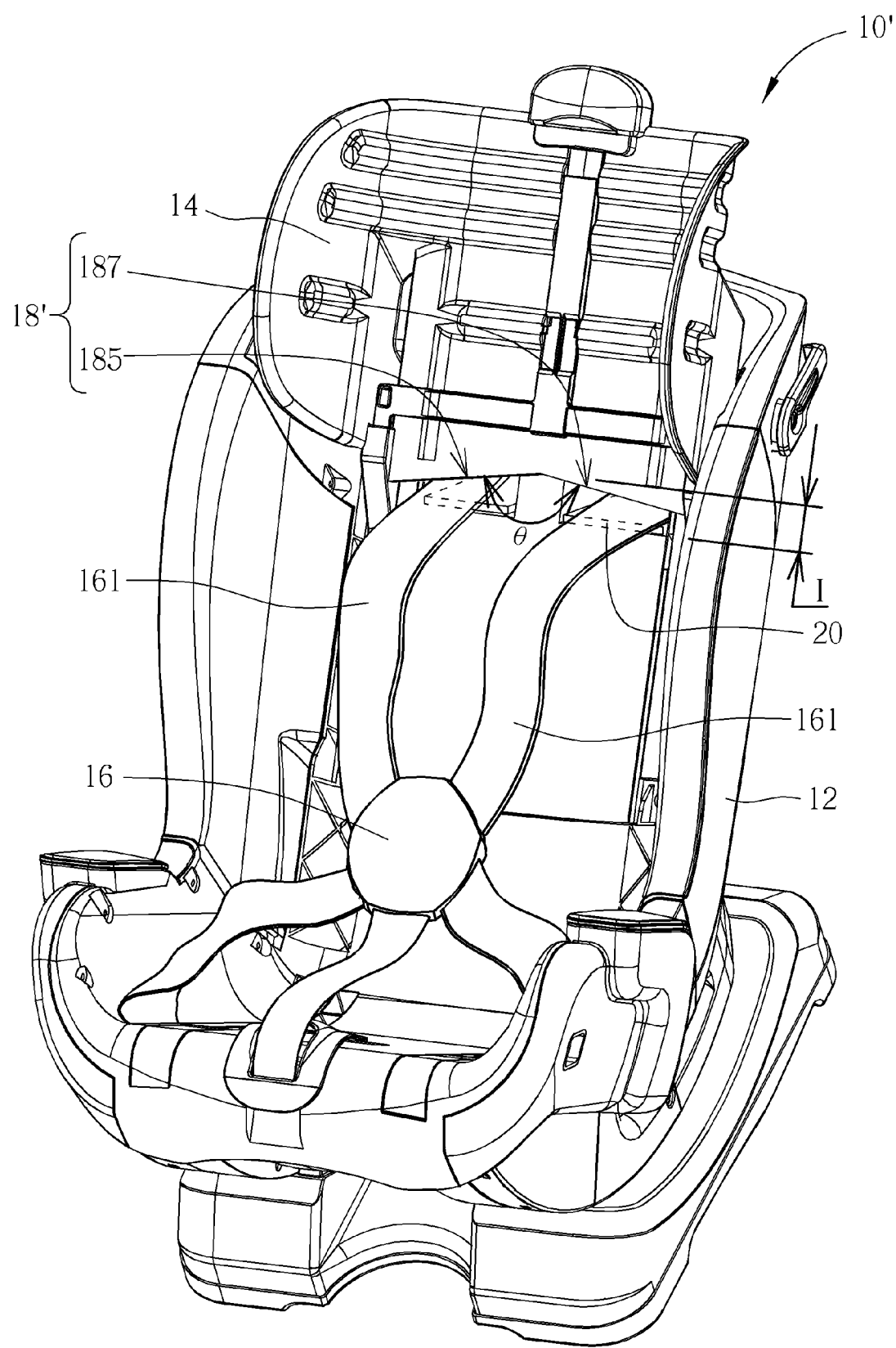
FIG. 3 is a diagram of a child safety seat according to a second embodiment of the present invention.

Please refer to FIG. 3. FIG. 3 is a diagram of a child safety seat 10' according to a second embodiment of the present invention. In the second embodiment, elements having the same numeral have the same structures and function as one of the first embodiment, and a detailed description is omitted herein for simplicity. The child safety seat 10' includes the seatback 12, the headrest 14 and the belt 16. Different between the first embodiment and the second embodiment is that the inclined guiding portion 18' of the headrest 14 is a turn structure with an angle. The inclined guiding portion 18' includes a first surface 185 and a second surface 187 connected to each other. The first surface 185 and the second surface 187 can be selectively designed as a planar surface or an arc surface, which depend on design demand. The angle θ is formed between the first surface 185 and the second surface 187. A value of the angle θ is smaller than 180 degrees, which means the indentation of the inclined structure 18' upwardly points the top of the child safety seat 10'. Height of two lateral ends of the inclined guiding portion 18' is lower than height of the middle of the inclined guiding portion 18'.

Figure 4:
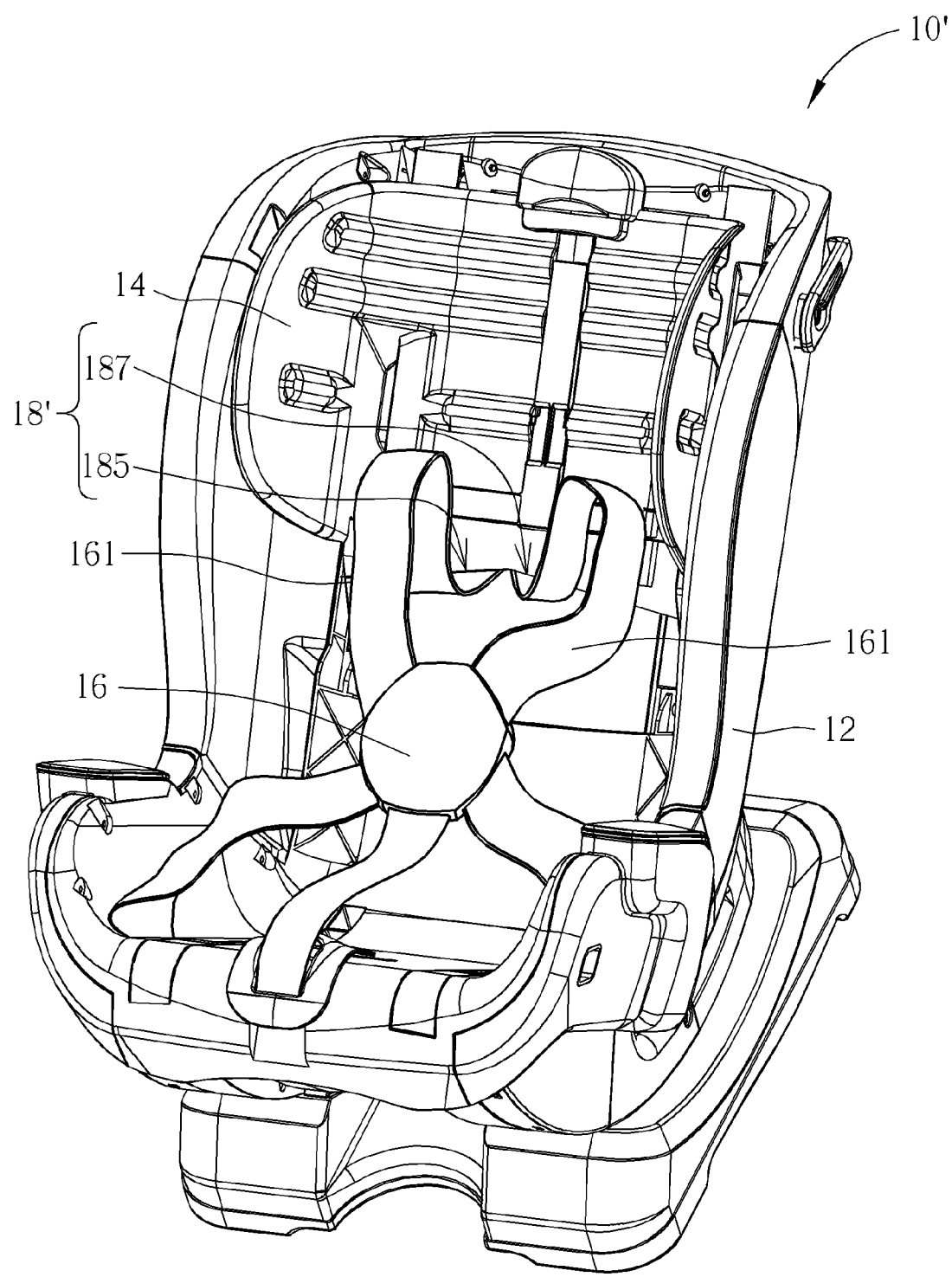
FIG. 4 is a diagram of the child safety seat in another operational mode according to the second embodiment of the present invention.

Please refer to FIG. 3 and FIG. 4. FIG. 4 is a diagram of the child safety seat 10' in another operational mode according to the second embodiment of the present invention. For adjusting the height of the headrest 14, the headrest 14 is moved downwardly, the bottom portion of the headrest 14 presses the belt 16, the belt 16 slides over the structural surface of the inclined guiding portion 18' and moves close to the center of the headrest 14, and the upper ends 161 of the belt 16 can be located at the angle θ of the indentation of the inclined structure 18', as shown in FIG. 4. Therefore, the distance between the upper ends 161 of the belt 16 can be decreased via the inclined guiding portion 18', so that the belt 16 moves close to the neck of the passenger to prevent the belt 16 from dropping from the shoulder.

In conclusion, the child safety seat of the present invention disposes the inclined guiding portion on the low edge of the headrest adjacent to the seatback. The indentation of the inclined guiding portion upwardly points to the top of the child safety seat. The belt is dropped and does not contact the headrest when nobody sits the child safety seat. As the passenger sits the child safety seat and is constrained by the belt, the belt can contact against the headrest because of a width distance (such as a thickness of ribcage) of the shoulder of the passenger. The belt slidably contacts the headrest. When the headrest moves relative to the belt downwardly, the indentation of the inclined guiding portion drives the upper ends (shoulder belts) of the belt to move from lateral sides to the middle of the headrest, to shorten the distance between the shoulder belts. Movement of the headrest relative to the seatback can drive the belt to shorten the distance between the shoulder belts by the inclined guiding portion. As the passenger owns a small body, the downward movement of the headrest is greater, and distance reduction between the upper sides (the shoulder belts) of the belt is accordingly greater so as to tightly cover the shoulder (and the neck) of the passenger. As the passenger owns the large body, the movement of the headrest is smaller, the distance reduction between the upper sides (the shoulder belts) of the belt is accordingly tiny, the belt can suitably cover the shoulder (and the neck) of the passenger to provide comfortable and safety environment.

The child safety seat of the present invention at least includes following advantages: the inclined guiding portion includes the indentation, the shoulder belts of the belt move close to each other via the indentation when the belt slides along the inclined guiding portion, and the distance between the shoulder belts is shortened to fit the shoulder and the neck of the passenger. In addition, the height of the headrest is adjustable. The belt can be automatically adjusted to vary the distance between the shoulder belts when the height of the headrest is changed, so as to accordingly increase the constraint and the safety of the child safety seat.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A child safety seat comprising:
    a seatback
    a headrest disposed on the seatback, the headrest being adapted to move relative to the seatback up and down, the headrest comprising an inclined guiding portion disposed on a bottom portion of the headrest, wherein an indentation of the inclined guiding portion points upward, and a lateral center point of the inclined guiding portion is higher than lateral sides of the inclined guiding portion; and
    a belt disposed between the seatback and the headrest, the belt slidably contacting the headrest when a passenger sits in the child safety seat and is constrained by the belt, and the headrest moves downwardly relative to the belt to press upon the belt so that the inclined guiding portion drives the belt to be close to a center of the headrest.

2. The child safety seat of claim 1, wherein the inclined guiding portion is disposed on a low edge of the headrest.

3. The child safety seat of claim 1, wherein the seatback comprises an opening disposed adjacent to the headrest, the belt passes through the opening to stretch from one side of the seatback to the other opposite side of the seatback.

4. The child safety seat of claim 1, wherein the inclined guiding portion is an arc structure.

5. The child safety seat of claim 1, wherein the inclined guiding portion comprises a first surface and a second surface connected to each other, an angle is formed between the first surface and the second surface.

6. The child safety seat of claim 5, wherein the first surface and the second surface respectively are a planar surface and an arc surface.

* * * * *